United States Patent

Haar

[11] 3,938,795
[45] Feb. 17, 1976

[54] RESILIENT SHOCK ABSORBING BUMPER

[75] Inventor: Richard Haar, Braunschweig, Germany

[73] Assignee: Volkswagenwerk Aktiengesellschaft, Wolfsburg, Germany

[22] Filed: Sept. 19, 1973

[21] Appl. No.: 398,818

[30] Foreign Application Priority Data
Sept. 21, 1972 Germany............................ 2246220

[52] U.S. Cl. ..................... 267/140; 114/219; 293/1; 293/62; 293/71 R
[51] Int. Cl.² B60R 19/08; B61F 19/04; F16F 3/10; F16F 7/00
[58] Field of Search .......... 49/388; 156/95; 293/19, 293/62, 63, 71 R, 1; 114/219; 267/140

[56] References Cited
UNITED STATES PATENTS

| | | | |
|---|---|---|---|
| 461,759 | 10/1891 | Koch | 114/219 |
| 1,754,112 | 4/1930 | Lusse | 293/71 R X |
| 1,754,122 | 4/1930 | Saunders et al. | 49/388 |
| 2,531,967 | 11/1950 | Bishop | 293/71 R |
| 3,074,751 | 1/1963 | Gerin | 293/62 X |
| 3,418,815 | 12/1968 | Kumazawa | 293/71 R X |
| 3,493,257 | 2/1970 | Fitzgerald et al. | 293/63 X |
| 3,514,144 | 5/1970 | Alderfer | 267/140 X |
| 3,543,465 | 12/1970 | Jackson | 293/1 X |
| 3,603,633 | 9/1971 | Eshelman | 293/19 |
| 3,607,497 | 9/1971 | Chrobak | 156/95 |
| 3,734,557 | 5/1973 | McKenzie | 293/71 R |
| 3,871,636 | 3/1975 | Boyle | 293/60 X |

FOREIGN PATENTS OR APPLICATIONS

| | | | |
|---|---|---|---|
| 1,000,702 | 1/1957 | Germany | 293/71 R |

Primary Examiner—Robert J. Spar
Assistant Examiner—Howard Beltran
Attorney, Agent, or Firm—Brumbaugh, Graves, Donohue & Raymond

[57] ABSTRACT

This disclosure concerns crush resistant bumpers suitable for use on vehicles. There is disclosed a resilient bumper cushion rigidly mounted on the vehicle and having an outwardly facing impact surface. A flexible belt is connected to the cushion in the vicinity of the impact surface and extends along the entire length of the cushion. The belt is connected to the cushion at points lying along the entire length of the interface between the belt and the cushion in order to disperse localized impact forces throughout the cushion.

9 Claims, 4 Drawing Figures

RESILIENT SHOCK ABSORBING BUMPER

BACKGROUND OF THE INVENTION

The present invention relates to bumpers in general, and more particularly to crush resistant vehicular bumpers for dissipating concentrated or localized impact forces in order to minimize the chance of permanent deformation or other damage to the bumper or to a vehicle provided with the bumper.

Resilient shock absorbing bumpers for vehicles have been known heretofore, and include, for example, the type of bumper disclosed in U.S. Pat. No. 1,754,122 to Robert J. Lusse. This patent discloses a bumper which is intended for use in amusement "bumper" cars. A highly resilient rubber cushion is peripherally connected around the circumference of the vehicle. The impact surface of the rubber cushion is covered with a flexible steel band which also extends circumferentially around the vehicle. The steel band is tightly secured to the vehicle by pairs of screws positioned substantially adjacent its abutting ends. The band is intended merely to resist the wear and tear resulting from the operation of the amusement car.

This arrangement, however, is not directed to resisting the effect of a highly localized or concentrated impact force, such as occurs when the bumper of an automobile is impacted against a railing or post or some protrusion from another vehicle. It is this type of collision, which, even at low speeds, can easily result in a permanent deformation of the bumper thereby requiring a considerable exxpenditure for effecting repairs. There is no disclosure in this patent that the bumper of the amusement car is intended to or is enabled to resist such a concentrated or localized impact without permanent deformation of the steel band.

Another type of vehicular bumper which has been utilized heretofore is disclosed in German Patent No. 1,000,702. This patent illustrates an automobile having a solid metal core which is imbedded within a plastic material. The plastic material is substantially thicker on one side of the metal core than it is on the other side. The thick portion of the material constitutes the impact accepting portion of the bumper.

There is no disclosure, however, that the imbedded metal core is in any way capable of resisting a localized or concentrated impact force without permanent deformation.

Still another form of bumper which has been used heretofore consists entirely of a unitary resilient fiber glass body. Some resistance to impact forces is achieved in this construction by utilizing a fiber glass material. However, such construction does not appear to have the capability of resisting permanent deformation or cracking in the presence of a highly concentrated impact force.

SUMMARY OF THE INVENTION

Accordingly, it is one object of the present invention to provide a shock absorbing bumper, particularly for use on vehicles, which effectively resists permanent deformation over a broad range of vehicle operating speeds.

Another object of the present invention is to provide a shock absorbing bumper capable of resisting permanent deformation in the presence of highly localized or concentrated impact forces.

Still another object of the present invention is to provide a shock absorbing impact resistant vehicular bumper which is economical to manufacture and which rarely requires replacement.

In accordance with these and other objects, the present invention provides a resilient bumper having a flexible belt element connected to the bumper at points lying along the entire interface between the belt and the body element. Highly concentrated or localized forces impacting against the bumper and its flexible belt are thereby effectively transmitted by the belt to diverse points within the body of the bumper. This dispersion of otherwise concentrated impact forces is effected as a result of the continuous interconnection along the interface between the belt element and the bumper material. The effect of a concentrated impact is minimized at the actual point of the impact, thereby reducing the possibility that such an impact will give rise to a permanent deformation of the bumper material.

The belt element may be a heavy interwoven fabric construction having fiber glass or steel strands. The belt preferably extends longitudinally across the entire length of the impact accepting portion of the bumper, and may either be imbedded within the material of the bumper or affixed externally to the impact area of the bumper.

BRIEF DESCRIPTION OF THE DRAWING

For a further understanding of the present invention, reference may be had to the accompanying drawings in which.

BRIEF DESCRIPTION OF THE PREFERRED EMBODIMENTS

Figure 1:
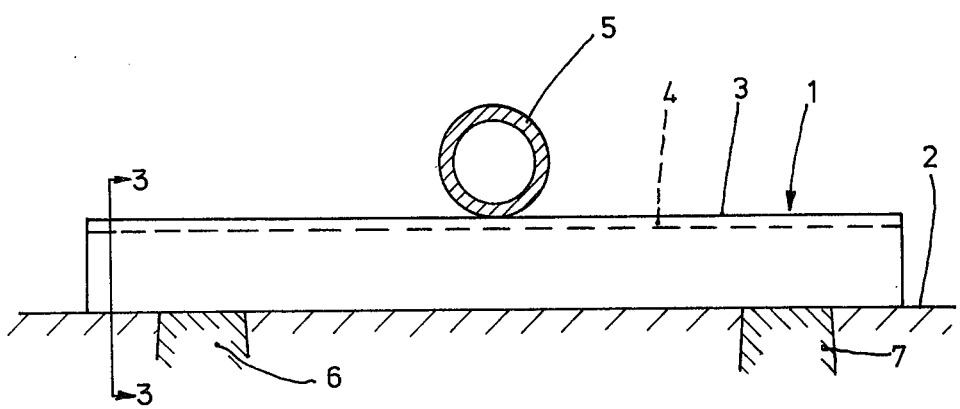
FIG. 1 is a schematic plan view of a bumper constructed in accordance with the present invention prior to an impact.

Referring now to the drawing, and in particular to FIG. 1, there is illustrated a shock absorbing bumper constructed in accordance with the present invention which consists of a body element 1, preferably formed from an elastically deformable plastic or rubber material such as, for example, polyurethane or ethylene-propylene rubber, a material also known by the brand name Nordel, a registered trademark of Dupont. In the embodiment illustrated, the body element 1 is secured to a reinforced body portion or frame 2 of the vehicle. Where desired, the body element 1 may be bonded directly to the vehicle by means of a synthetic resin, or the like, or may be mounted on the ends of protruding bumper supports or similar frame members of the vehicle.

An impact resistant bond or belt 4 is connected to the elastic body element 1 in the vicinity of the external impact accepting surface area 3 of the bumper body. In the preferred embodiment, the belt 4 is imbedded in the material of the body element 1 in a position substantially adjacent to and underlying the impact accepting surface 3. The belt 4 extends along the entire longitudinal dimension of the impact accepting surface of the body element, and is bonded to or affixed to the body element 1 at points which lie along this length.

In one embodiment of the invention, the belt 4 is bonded to the material of the body element 1 at each interface between the belt and the elastic material of the body element. This may be accomplished, for example, by injection molding the plastic or rubber material around the belt. Alternatively, the bonding agent may be a synthetic resin, or other suitable agent, known to those skilled in the art as being capable of withstanding the anticipated stresses and strains to be induced during normal operation of the vehicle.

It should be noted, that the invention is not to be limited to any particular type of bonding material or interconnection between the belt and the elastic body material. As will be appreciated by those skilled in the art, the selection of the particular technique for securing the belt to the body element, may often depend upon the nature of the particular materials involved. In accordance with the invention, however, the belt 4 is connected to the resilient body of the bumper at points lying substantially along the entire length of the interface between the belt and the bumper material.

In the embodiment illustrated, the belt 4 is enclosed or surrounded on all sides by the material of the body element 1. It should be noted, however, that the invention need not be limited to this arrangement, and that under some circumstances, it may be desirable to affix the belt 4 along one of its major surfaces directly to the external impact surface 3 of the bumper. In this event, any adhesive or bonding agent capable of adhering to both the bumper material and the belt will be suitable.

The belt 4 may be constructed similarly to a heavy interwoven or layered fabric made with glass fibers or steel strands, as desired. Other textiles made of glass fiber and produced in various types of weaves or meshes may also be suitable. The belt may also be a flexible resilient band made of metal, such as steel, or some other material strong enough to resist impact forces. An important aspect of the belt construction is that the belt is suitably resilient and does not stretch when deformed by an impact force. Being resistant to stretching, the belt is said to be substantially stable in its longitudinal dimension. The interconnection between the belt and the bumper material is preferably continuous along the length of the belt which defines the impact accepting surface of the bumper. However, such interconnection may be interrupted if necessary, although it is preferred that the points of interconnection define, at least, a line which is substantially coextensive with the length of the belt.

Figure 2:
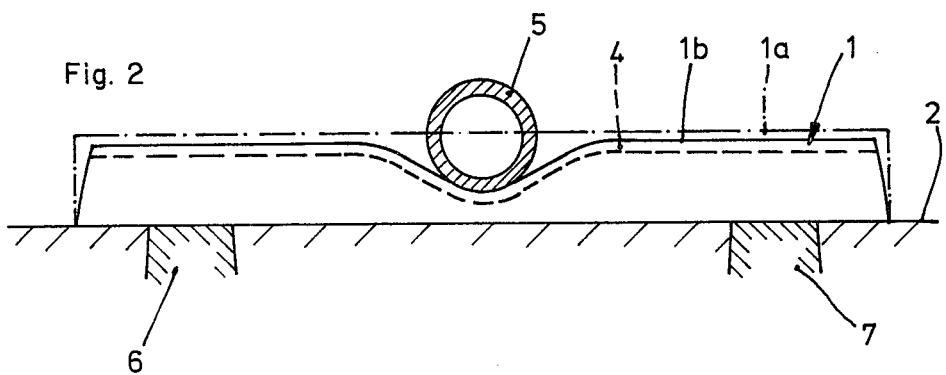
FIG. 2 is a view similar to FIG. 1 of the bumper during the course of an impact.
Figure 3:
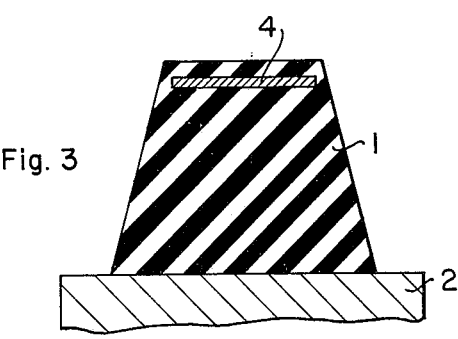
FIG. 3 is a cross-sectional view taken along the line 3—3 of FIG. 1.
Figure 4:
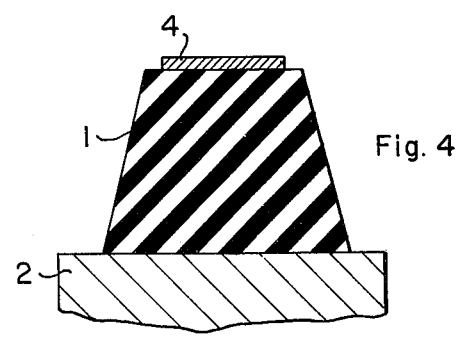
FIG. 4 is a cross-sectional view similar to FIG. 3, showing an alternate embodiment of the invention.

FIG. 2 illustrates the operation of the present invention. The bumper, constructed in accordance with the present invention, is undergoing a concentrated impact force resulting from engagement with a tube-shaped object 5. Under these circumstances, the shape of the bumper body element 1 is altered from that indicated by the phantom line 1a, to the position indicated by reference numeral 1b. The forces which develop at the point of impact between the body element 1 and the tube 5a are effectively dispersed longitudinally throughout the length of the body element by means of the action of the flexible belt 4. As a result of the impact with the tube 5, the belt 4, flexes in the direction of the impact force thereby reducing its transverse or longitudinal extension. Since the belt 4 is connected to the body element 1 at every point along its longitudinal dimension, the forces which develop at the point of impact are transmitted longitudinally throughout the length of the body element 1. These forces, therefore, have components directed substantially parallel to the plane of the impact surface area of the bumper prior to the collision illustrated, thereby deforming the shape of the body element to that indicated by the reference numeral 1b.

It is apparent that in the absence of the belt 4, the impact with the tube 5 would merely compress the material of the body element 1 in the immediate vicinity of the impact area. The distal or remote ranges of the body element 1 would therefore not be drawn into participation with the resistive forces developed in the body element in the vicinity of the impact. Thus, in the absence of the belt 4, the overall resistance of the bumper to such an impact is considerably reduced, and there is a greater chance that the collision will result in permanent deformation or other damage.

The body element 1 may consist of homogenous material or comprise structures, for instance resulting from small cavities created by a foaming process or from larger chambers inside the body element.

What is claimed is:

1. A crush resistant bumper for protecting an object against impact collisions, said object having a continuous elongate support surface for said bumper; said bumper comprising:
    an elongate resilient cushion member having one side disposed on said support surface of said object, said one side being attached to said support surface in a substantially continuous line along substantially the entire length of said cushion member, said cushion member having an impact accepting surface on the side thereof which is opposite said one side and faces away from said support surface; and
    a flexible, pliant band of high tensile strength which is substantially stable in its longitudinal dimension, said band being secured on said cushion member in a region thereof which is closer to said impact accepting surface than to said support surface, said band further being attached to said cushion member at points which define a substantially continuous line substantially coextensive with the long dimension of said impact accepting surface,
    whereby forces impacting against a restricted area of said bumper are distributed longitudinally by said band to and along said cushion member to resist permanent crushing of said cushion member in the vicinity of the impact area.

2. The crush resistant bumper of claim 1 in which said flexible band is bonded to said cushion along substantially the entire interface between said band and said cushion.

3. The crush resistant bumper of claim 1 in which said flexible band is enclosed on all sides by the material of said cushion.

4. The crush resistant bumper of claim 2 in which said band is secured substantially parallel to the impact accepting surface of said cushion.

5. The crush resistant bumper of claim 1 in which said cushion comprises an homogeneous elastically deformable material.

6. The crush resistant bumper of claim 1 in which said band is bonded to on said impact accepting surface.

7. A crush resistant bumper for protecting an object from impact collisions, said object having a continuous elongate support surface for said bumper; said bumper comprising:
- an elongate resilient cushion member having one longitudinal side attached to said support surface in a substantially continuous line along substantially the entire length of said cushion member; and
- a flexible, pliant band of high tensile strength which is substantially stable in its longitudinal dimension, said band being secured on the longitudinal side of said cushion member which is opposite said one side and faces away from said support surface, said band defining an outwardly facing impact accepting surface, said band further being attached to said cushion member at points which define a substantially continuous line substantially coextensive with its long dimension,
- whereby forces impacting against a restricted area of said bumper are distributed longitudinally by said band to and along said cushion member to resist permanent crushing of said cushion member in the vicinity of the impact area.

8. The crush resistant bumper of claim 7 in which said band comprises a belt formed of glass fibers.

9. The crush resistant bumper of claim 7 in which said band comprises a belt formed of metal fibers.

* * * * *